United States Patent
Serenyi et al.

(10) Patent No.: US 8,261,320 B1
(45) Date of Patent: Sep. 4, 2012

(54) SYSTEMS AND METHODS FOR SECURELY MANAGING ACCESS TO DATA

(75) Inventors: Denis Serenyi, Arlington, VA (US); Brian Witten, Reston, VA (US)

(73) Assignee: Symantec Corporation, Mountain View, CA (US)

( * ) Notice: Subject to any disclaimer, the term of this patent is extended or adjusted under 35 U.S.C. 154(b) by 1087 days.

(21) Appl. No.: 12/165,146

(22) Filed: Jun. 30, 2008

(51) Int. Cl.
*G06F 7/04* (2006.01)
*G06F 17/30* (2006.01)

(52) U.S. Cl. .................... 726/2; 726/4; 726/27; 726/21; 713/193; 713/194; 711/163; 711/6; 718/1

(58) Field of Classification Search ........................ None
See application file for complete search history.

(56) References Cited

U.S. PATENT DOCUMENTS

| | | | |
|---|---|---|---|
| 6,947,556 B1 * | 9/2005 | Matyas et al. | 380/29 |
| 7,529,946 B2 * | 5/2009 | Ray et al. | 713/193 |
| 2005/0257271 A1 * | 11/2005 | Lafornara et al. | 726/26 |
| 2006/0259782 A1 * | 11/2006 | Wang et al. | 713/189 |
| 2007/0094719 A1 * | 4/2007 | Scarlata | 726/9 |
| 2009/0222915 A1 * | 9/2009 | Challener et al. | 726/21 |
| 2010/0235649 A1 * | 9/2010 | Jeffries et al. | 713/189 |

OTHER PUBLICATIONS

Cooper et al., "Towards an Open, Trusted Digital Rights Management Platform," DRM'06, Oct. 30, 2006, Alexandria, VA.

* cited by examiner

*Primary Examiner* — Fikremariam A Yalew
(74) *Attorney, Agent, or Firm* — Advantedge Law Group (57) ABSTRACT

A computer-implemented method for securely managing access to data may comprise identifying a request to access data that is encrypted, the request being made within an insecure platform. The method may: determine that a requestor has a right to access the data, decrypt the data to provide decrypted data, and permit a secure platform to access the decrypted data. A computer-implemented method for securely managing access to data may comprise identifying a request to access data that is encrypted, the request being made within an insecure platform. They method may: submit the request to a policy server, receive permission from the policy server to access the data, decrypt the data to provide decrypted data, and permit a secure platform to access the decrypted data. A system for securely managing access to data may comprise: an authorization platform, an authentication module, a policy-enforcement module, and a cryptography module.

17 Claims, 8 Drawing Sheets

SYSTEMS AND METHODS FOR SECURELY MANAGING ACCESS TO DATA

BACKGROUND

Organizations that rely extensively on computer systems in carrying out their business need to have control over their internal information. In addition to malware threats, these organizations may need to protect their information from accidental and intentional employee mishandling. A leak of intellectual property, financial data, or employee email can potentially harm a company. This has led companies to use information rights management systems.

Many current information rights management (IRM) systems may protect data by embedding themselves within the applications used to create, edit, or view information. IRM-system providers, consequentially, may tailor their software to support each individual application and each operating system used by their clients. Although IRM systems often store confidential data in an encrypted state, the data may sit decrypted in memory while in use. Attacks targeted at host operating systems or specific applications may compromise the IRM system and result in a loss or theft of the confidential data in memory.

Virtualization and trusted hardware technologies have emerged as possibilities for overcoming these problems. Computer scientists have proposed systems for rudimentary digital rights management that utilize these technologies. However, these systems may fail to provide an adequate framework for creating a widely adaptable, policy-based information rights management system that meets customers' broad-ranging needs.

SUMMARY

As will be described in further detail below, this disclosure relates to methods and systems for securely managing access to data. For example, a method for securely managing access to data may comprise identifying a request to access encrypted data. The request may be made by an application running on an insecure platform. After determining whether a requestor has a right to access the data, the data may be decrypted, and a separate and secure platform may be permitted to access the data.

The method may be realized in a variety of embodiments. In a certain embodiment, a user may request access to an encrypted file on a computing system that contains proprietary information. To prevent misuse of the file and its contents, a program may recognize the attempt to access the file and determine that the user has a right to access the file. This determination may be made according to certain policies and/or based on the user's identity. If the user has a right to access the file, the file may be decrypted. Rather than allowing the user to access the decrypted file in an insecure environment (i.e., an insecure platform), where it may be accessible to malware, the user may be allowed to access the file through a secure environment for viewing and editing data.

Trusted hardware and/or virtualization technologies may enable creation of the secure environment, also referred to herein as a secure platform. The computing system may define clear boundaries, in software and hardware, between the secure platform and the insecure platform. Using the trusted hardware and carefully controlling the flow of information entering and leaving the secure and insecure platforms may prevent malicious and/or unauthorized access to sensitive data.

In an additional embodiment, an authorization management platform may process the request to access a file and may send the request over a network to a policy server. The policy server may enforce a variety of policies by applying the policies to users and their requests for data access. The authorization management platform may add a signature to the user's request to further ensure the security of data. As mentioned, information management systems may store data in an encrypted form, so the files may need to be decrypted before they can be accessed on the secure platform. In certain embodiments, computer software keys may be used to permit decryption. These keys may be issued from the policy server or may be stored locally if secure local storage is available, such as secure local storage offered by trusted computing hardware.

A system corresponding to the above methods is also disclosed. In addition, features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Throughout the detailed description that follows, all elements in each figure are assigned unique, three-digit numbers for identification. In all cases, the first digit of an element's three-digit identifier is the number of the figure of which it is a part. For example, an element 102 would be an element in FIG. 1.

DETAILED DESCRIPTION OF EXEMPLARY EMBODIMENTS

The instant disclosure generally relates to systems and methods for securely managing access to data. Some embodiments may include methods for managing data according to locally established policies. Other embodiments may include a policy server to determine access according to remotely stored policies. A system for securely managing access to data is also discussed in connection with these methods. The methods and systems disclosed herein may improve the security of data management systems. As treated in greater detail below, the methods and systems disclosed herein may provide various other features and advantages.

Figure 1:
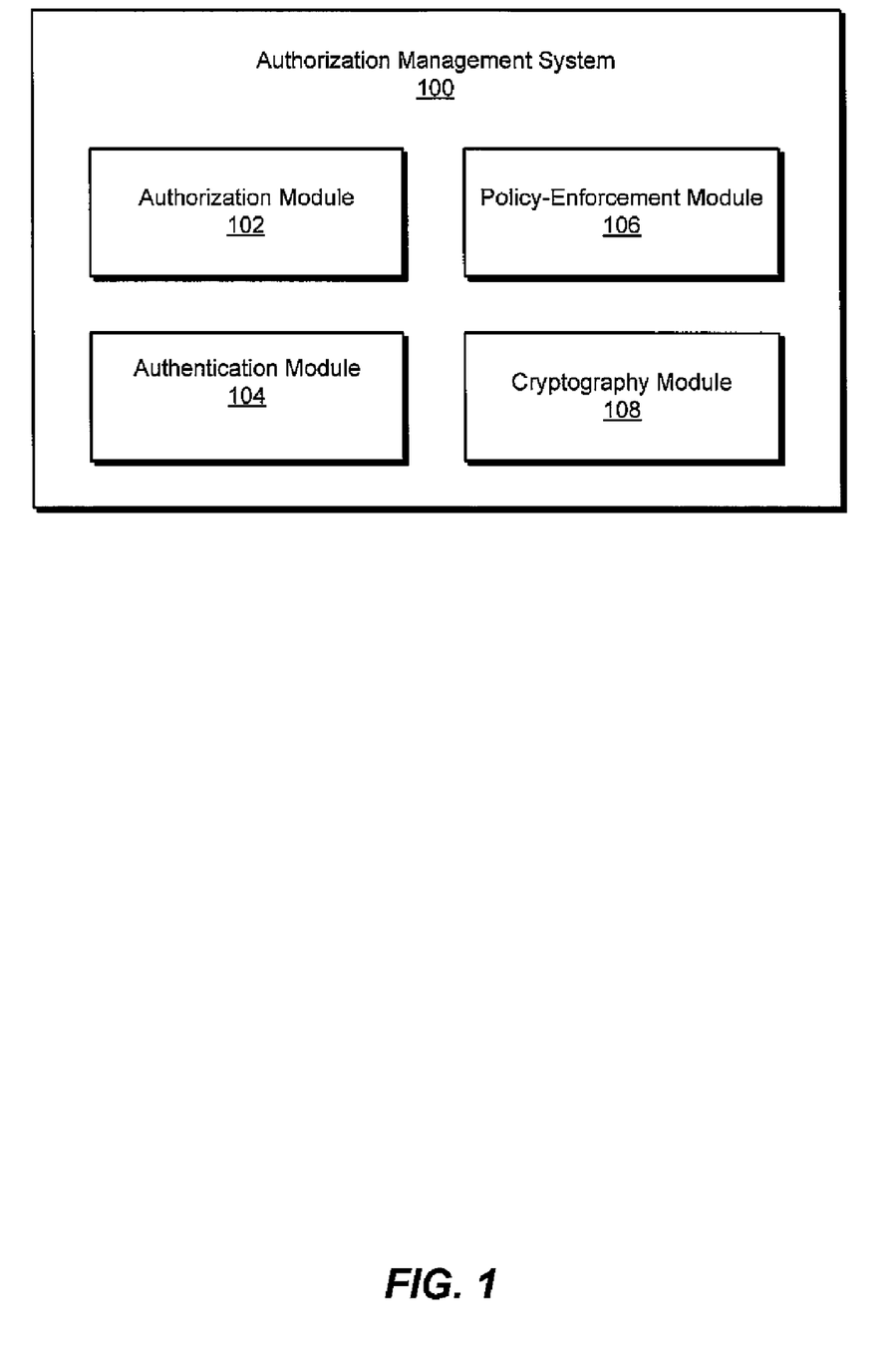
FIG. 1 is a block diagram of an exemplary authorization management system for securely managing access to data according to at least one embodiment.
Figure 2:
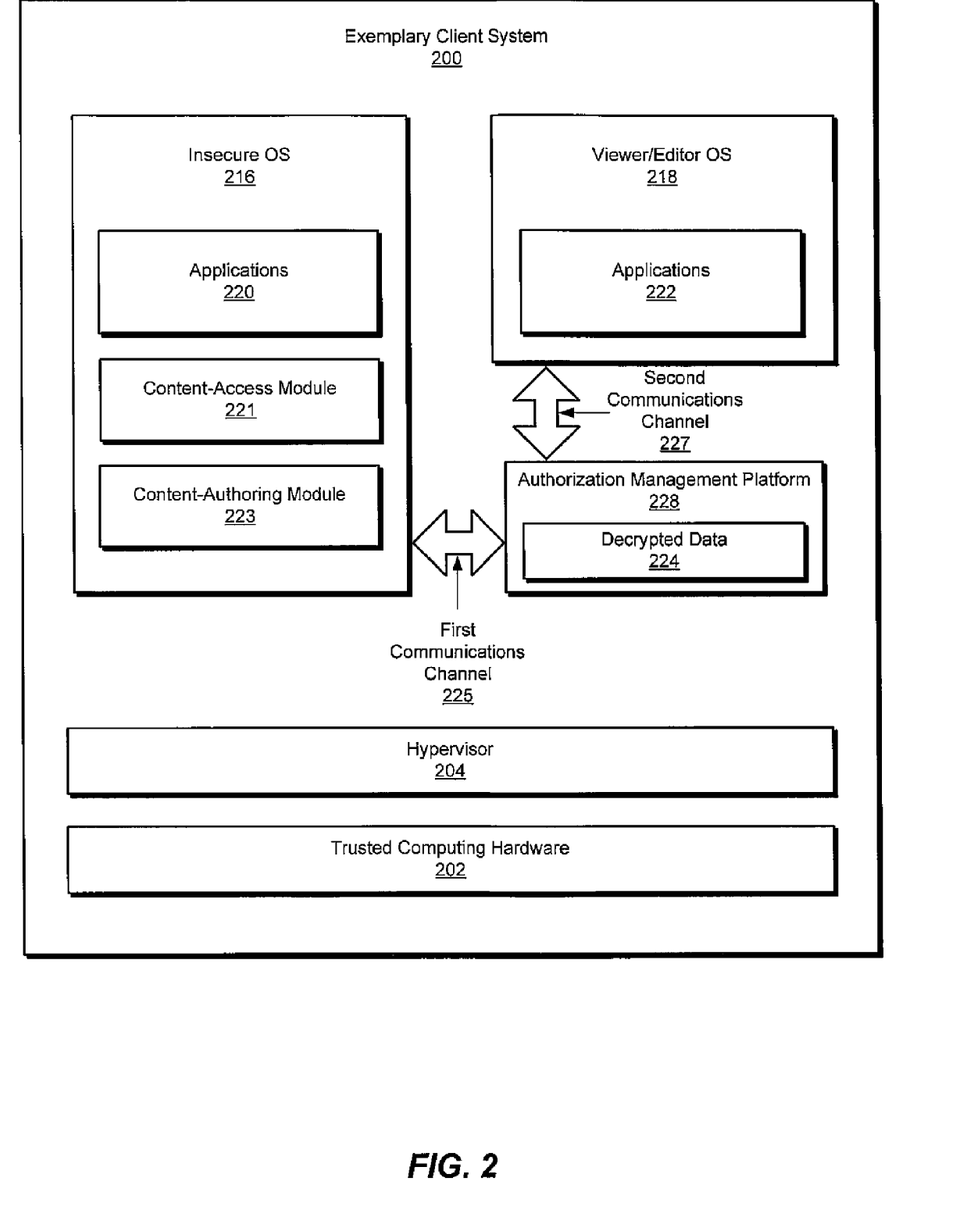
FIG. 2 is a block diagram illustrating many components of an exemplary client system for securely managing access to data according to at least one embodiment.
Figure 3:
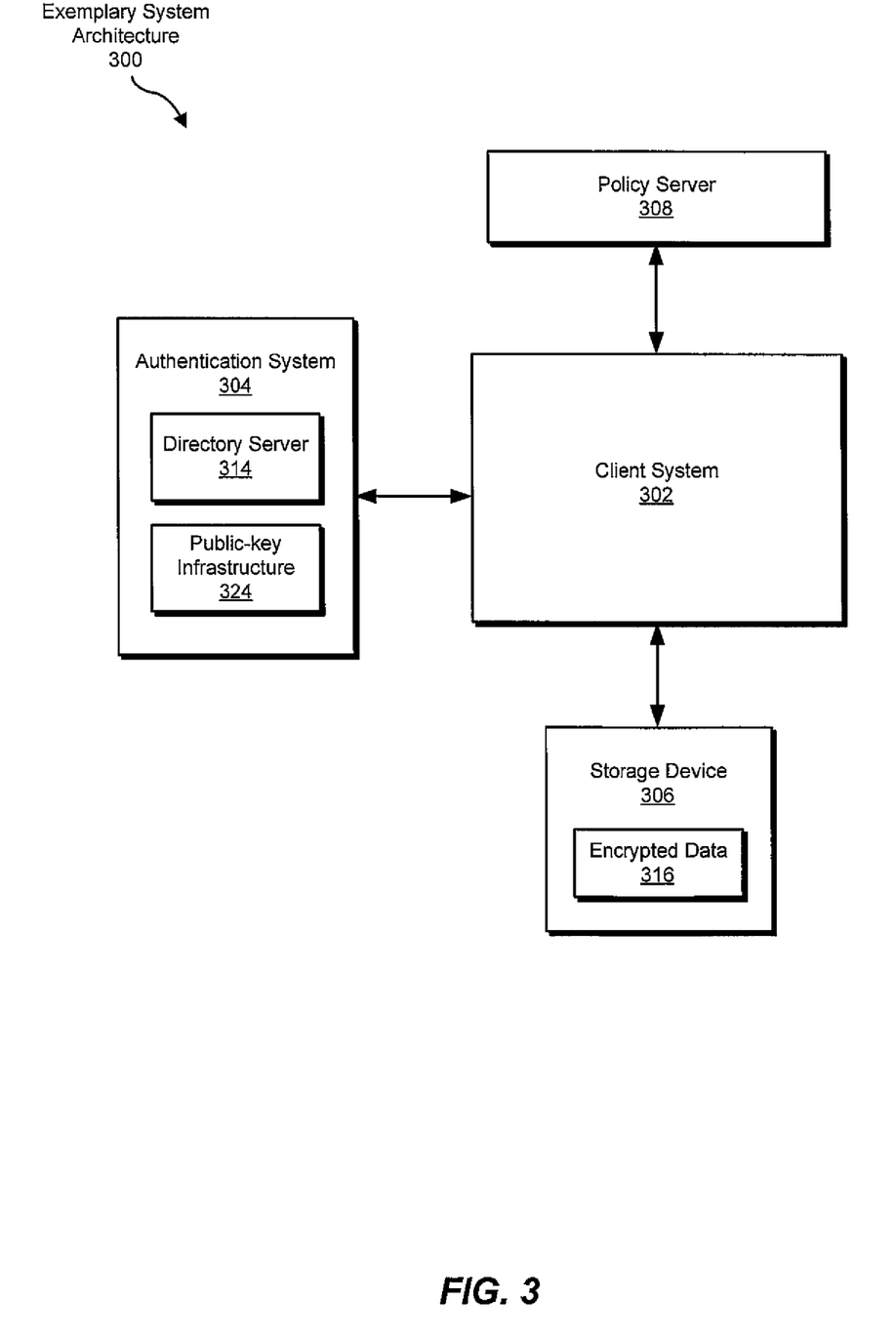
FIG. 3 is a block diagram of an exemplary system architecture for securely managing access to data according to at least one embodiment.
Figure 4:
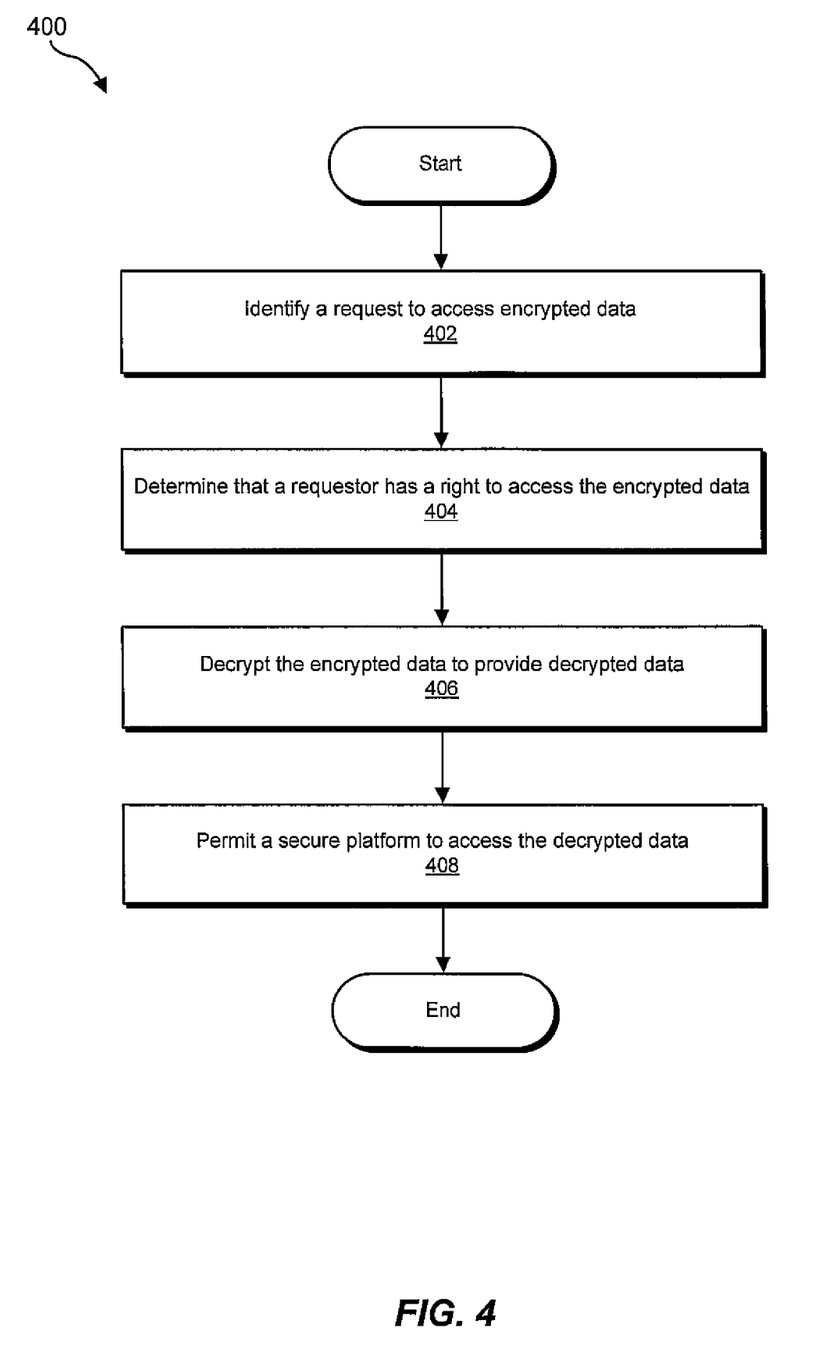
FIG. 4 is a flow diagram of an exemplary method for securely managing access to data according to at least one embodiment.
Figure 5:
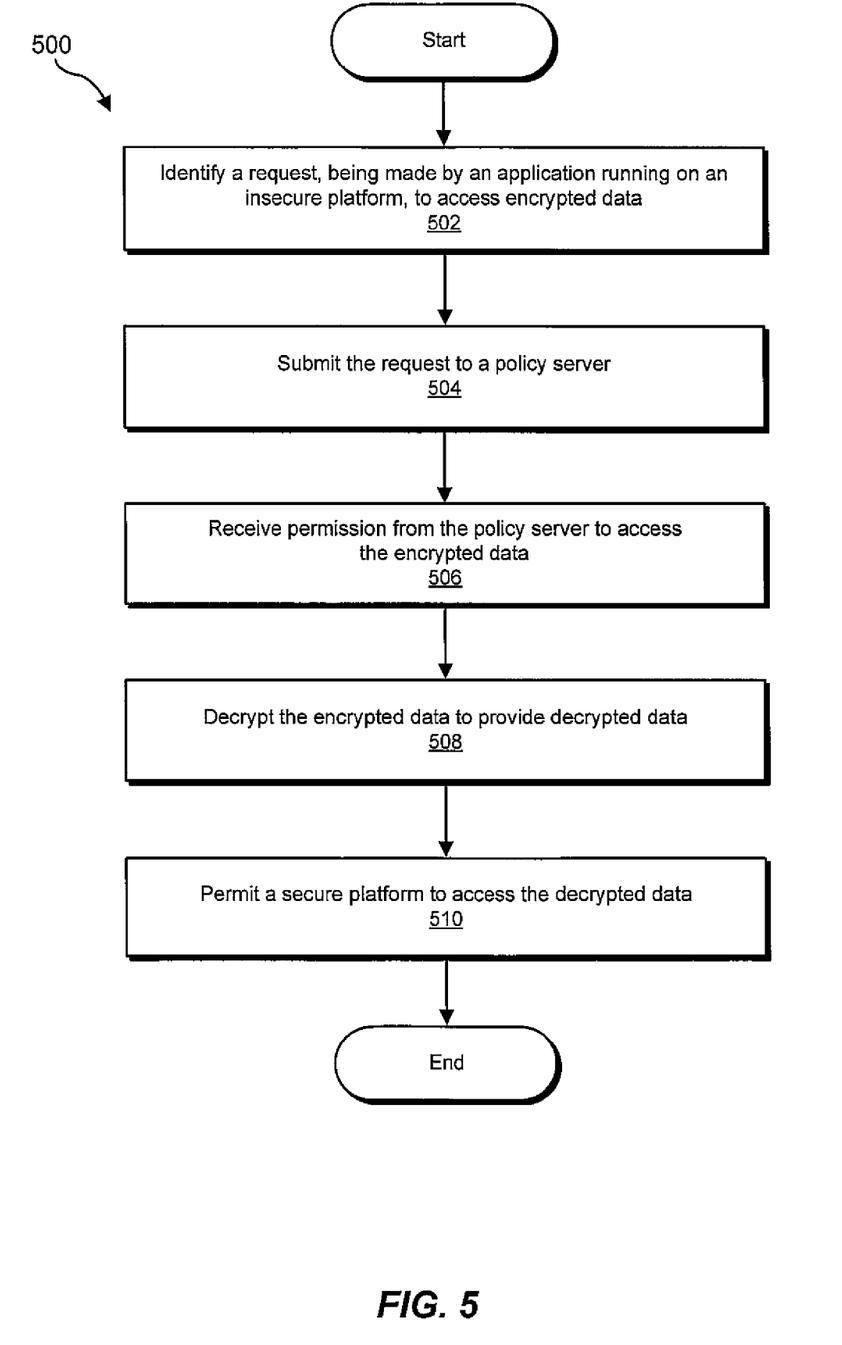
FIG. 5 is a flow diagram of an exemplary method for securely managing access to data by using a policy server.
Figure 6:
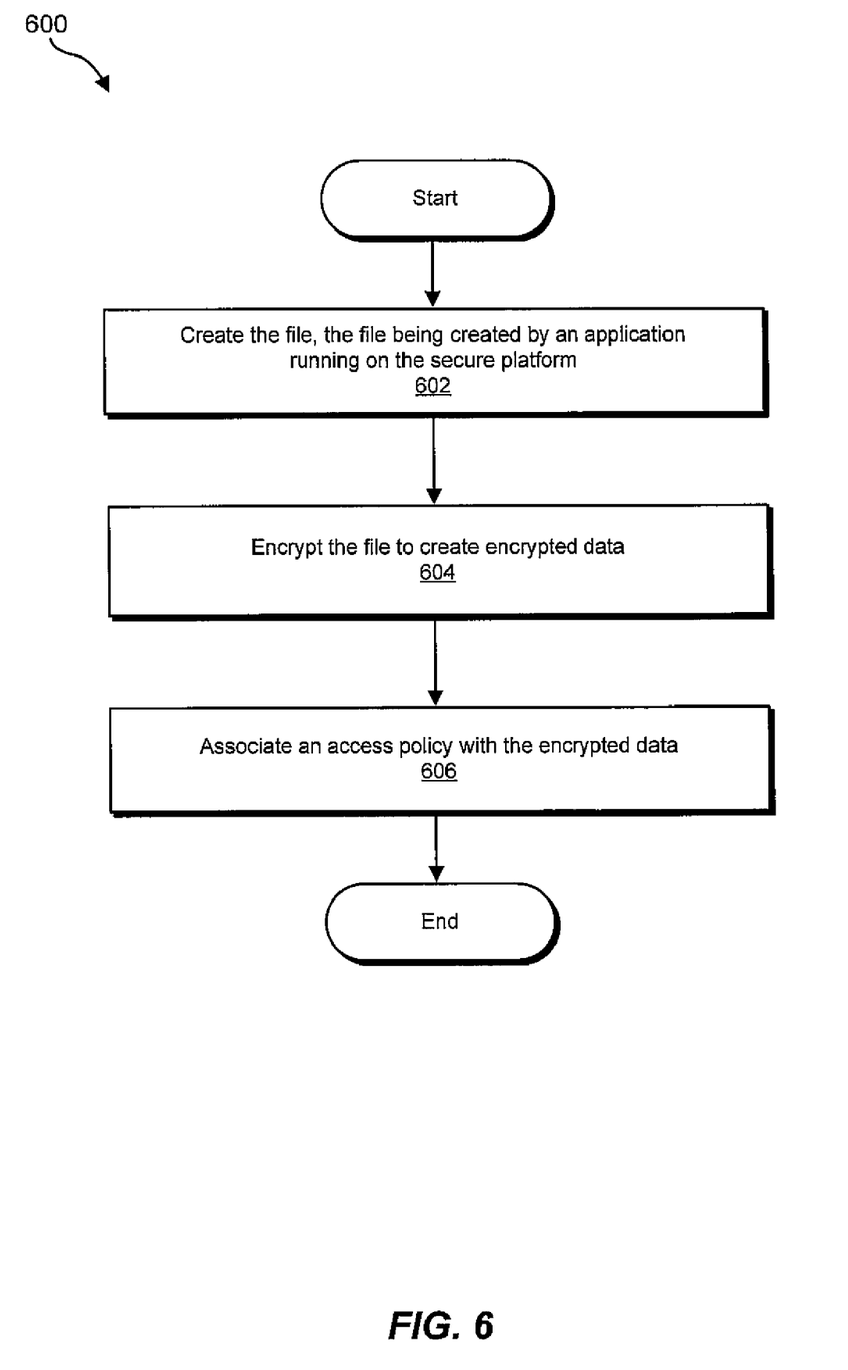
FIG. 6 is a flow diagram of an exemplary method for creating a file within the securely managed system according to at least one embodiment.

In the following disclosure, FIGS. 1 and 4 provide an overview of exemplary embodiments for securely managing access to data. FIGS. 2 and 3 demonstrate embodiments of client systems for use in a system to securely manage access to data. FIGS. 5 and 6 illustrate methods for governing access policies with a policy server and for creating new data that is accessible through the managed system. FIGS. 1, 2, and 3 all show systems that implement methods for securely managing access to data. FIG. 1 may present a more detailed illustration of certain elements contained in FIG. 2. Likewise, FIG. 2 may present a more detailed illustration of certain elements contained in FIG. 3.

FIG. 1 illustrates an authorization management system 100 that may run on a computing device. Authorization management system 100 may include an authorization module 102, an authentication module 104, a policy-enforcement module 106, and a cryptography module 108. Authorization module 102 may be programmed to identify requests to edit, read, and/or view data. For example, authorization module 102 may identify a request, made within an application also running on the computing device, to view encrypted data.

Policy-enforcement module 106 may be programmed to determine, using information about a requestor obtained by or from authentication module 104, that a requestor has a right to access the encrypted data being requested. To provide information about users and requestors, authentication module 104 may be programmed to communicate with an authentication system. Policy-enforcement module 106 may also be programmed to communicate with a policy server to determine whether the requestor has the right to access the encrypted data. After cryptography module 108, which may be programmed to encrypt and decrypt data, decrypts the encrypted data to provide decrypted data, authorization module 102 may permit a secure platform to access the decrypted data. Authorization module 102 may also be programmed to send data to, and receive data from, a secure platform.

For example, authorization module 102 may identify a request to access encrypted data. In some embodiments, authorization module 102 may add information, such as information about the hypervisor and local computing hardware, to the request. The encrypted data being requested may be encrypted data 316 in FIG. 3. FIG. 3 illustrates an exemplary system architecture 300, which may include a client system 302, an authentication system 304, a storage device 306, and a policy server 308.

Client system 302 may be a computing device capable of running authorization management system 100. Authentication system 304 may be programmed to supply information to authentication module 104 about the access rights of a requestor to encrypted data 316. Authentication system 304 may comprise a directory server 314 (e.g., a LDAP server, ACTIVE DIRECTORY, etc.) and a public-key infrastructure 324 (e.g., X.509, etc.). Storage device 306 may be a magnetic disk drive (e.g., a hard drive), a floppy disk drive, a magnetic tape drive, an optical disk drive, a flash drive, or the like. Data, such as encrypted data 316, may be stored on storage device 306. In some embodiments, storage device 306 may be a file server connected to client system 302 by a network.

Authorization module 102 and/or policy-enforcement module 106 may communicate with policy server 308 to determine if the requestor has the right to access encrypted data 316. In some embodiments, authorization module 102 and/or policy-enforcement module 106 may determine if the requestor has the right to access encrypted data 316 in the context of the hardware and hypervisor from which they are requesting access, and/or in context of the moment in time when they are requesting access. Policy server 308 may comprise a computing device running software capable of determining that the requestor has the right to access encrypted data 316. Policy server 308 may store encryption and/or decryption keys that may be used for decrypting and encrypting protected data. If policy server 308 determines that a requestor has the right to access encrypted data 316, authentication management system 100 may receive permission to allow access to encrypted data. Policy server 308 may allow access to encrypted data by releasing an encryption key to client 302. Encrypted data 316 may then be decrypted by cryptography module 108. Cryptography module 108 may then provide the decrypted data to a secure platform (i.e., a sandboxed viewer/editor OS) running on client system 302.

At least one embodiment of client system 302 is illustrated in exemplary client system 200 in FIG. 2. Exemplary client system 200 may comprise a computing device, such as a desktop computer, a laptop, a workstation, or a portable computing device. In some embodiments, client system 200 may conform to trusted computing standards (such as those of the TRUSTED COMPUTING GROUP) to provide trusted hardware 202. The secure platform for editing and viewing documents may require the use of trusted hardware to securely manage access to data. In other words, trusted hardware may be essential for creating a secure platform, such as a sandbox for viewing and editing decrypted content. A hypervisor 204 may be running on trusted hardware 202. Hypervisor 204 may manage a plurality of virtual machines. For example, hypervisor 204 may manage a secure virtual machine and an insecure virtual machine.

Hypervisor 204 may be a hypervisor such as XEN, CITRIX's XENSERVER, SUN's XVM SERVER, SUN's VIRTUALBOX, MICROSOFT's HYPER-V, MICROSOFT's VIRTUAL PC, GREEN HILL SOFTWARE's INTEGRITY PADDED CELL, PHOENIX's HYPERCORE, VIRTUALLOGIX's VLX, IBM's POWER, LYNUXWORKS' LYNXSECURE, TRANGO, or any other suitable hypervisor or virtual machine monitor. In some embodiments, a virtual machine monitor may be a separation kernel, which may compartmentalize the platform and provide strong separation properties.

An insecure OS 216 may run on hypervisor 204 as the insecure virtual machine and may provide for the insecure platform previously mentioned. Applications 220 may be running on insecure OS 216. Insecure OS 216 may be a WINDOWS operating system (e.g., WINDOWS XP, WINDOWS VISTA, etc.), a MACINTOSH operating system (e.g., MAC OS 10), a UNIX operating system (e.g., AIX, SOLARIS), a LINUX operating system, or any other suitable operating system. Hypervisor 204 may grant insecure OS 216 access to trusted hardware 202, including access to networked devices (e.g., servers, storage, etc.) and peripheral devices (e.g., printers, disk-drives, card-readers, etc.). Insecure OS 216 may run applications 220, which may be typical commercial applications (e.g., WORD, MATLAB, AUTOCAD, etc.) used for accessing data and files.

Insecure OS 216 may also comprise a content-access module 221 and a content-authoring module 223. Content-access module 221 may retrieve information about a user's access rights from authentication system 304 and transmit them to authentication module 104. In another embodiment, content-access module 221 may also comprise access policies. Similarly, content-authoring module 223 may retrieve information about a user's authoring rights from authentication system 304 and transmit them to authentication module 104. Content-authoring module 223 may also comprise access policies as they relate to authoring and creating contents, documents, files, and/or data. The access policies and information may be included in requests to access encrypted data.

Hypervisor 204 may also manage an authorization management platform 228 as a secure virtual machine. Authorization management platform 228 may comprise authorization management system 100 as seen in FIG. 1 and may perform all functions previously associated with authorization management system 100. Additionally, authorization management platform 228 may comprise decrypted data 224. Decrypted data 224 may be stored in memory that is associated with authorization management platform 228. In certain embodiments, policy server 308 may remotely attest or confirm that authorization management platform 228 is running on a secure platform such as secure platform.

For example, trusted hardware 202 may analyze exemplary client system 200 while authorization management platform 228 boots up. The results of the analysis may be stored in secure registers until they are signed with a private key associated with trusted hardware 202 and transmitted to policy server 308. In this manner, policy server 308 may certify that it is communicating with authorization management platform 228 running securely on trusted hardware 202. The policy server may also certify in this way that the requests submitted by authorization management platform 228 can be trusted. If policy server 308 determines that authorization management platform 228 is not secure, policy server 308 may not release keys to permit access to encrypted data.

A viewer/editor OS 218 may also run on hypervisor 204 as a secure virtual machine and may serve as or provide for the secure platform previously mentioned. In some embodiments, viewer/editor OS 218 may be secured by the hypervisor limiting hardware access on viewed/editor OS 218, as described in greater detail below. The viewer/editor OS 218 may be any operating system mentioned previously as being suitable for insecure OS 216. Viewer/editor OS 218 may run applications 222, which may be typical commercial applications (e.g., WORD, MATLAB, AUTOCAD, etc.). Applications 222 may also comprise any other computer software. Many embodiments disclosed herein, in contrast to prior solutions, do not require modification of applications to allow data to be securely viewed or edited through the applications.

Unlike insecure OS 216, viewer/editor OS 218 may have limited access to I/O devices (e.g., network interface cards, printers, card-readers, and other devices connected to trusted hardware 202 through USB, IEEE 1394, or other suitable connection standards). Hypervisor 204, in combination with trusted hardware 202, may enforce the I/O access limitations on viewer/editor OS 218. In certain embodiments, I/O access of viewer/editor OS 218 may be limited to receiving input from a keyboard and a mouse and to outputting to a video card for display. Typical constraints on I/O access of viewer/editor OS 218 may also include restricting network communications to encrypted communications with a physical proxy or virtual proxy that is capable of enforcing complex policies and directing all persistent storage requests to cryptography module 108, which may store all data with the same keys and policy-based restrictions that apply to opening the protected information in viewer/editor OS 218. Additionally, the physical memory allotted to viewer/editor OS 218 by hypervisor 204 and memory controller 718 of FIG. 7 may be curtailed memory, as is known in the art. Curtailed memory may use memory protection techniques to provide for isolation of sensitive areas of memory. This is done to prevent any insecure virtual machines that may be running on hypervisor 204 from accessing decrypted data 224.

FIG. 4 is a flow diagram showing an exemplary method 400 for securely managing access to data. The method begins at step 402, where an authorization module may identify a request to access encrypted data. For example, one of applications 220 in FIG. 2 may make a request to access encrypted data 316 in FIG. 3. Authorization module 102 in FIG. 1 may identify the request. Depending on how later steps of exemplary method 400 are performed, the request may comprise encrypted data 316 in FIG. 3, an access-policy associated with encrypted data 316, and a proof of a right of a requestor to access encrypted data 316. The request may be transmitted to authorization management platform 228 in FIG. 2 from insecure OS 216 through a first communications channel 225.

Hypervisor 204 may create first communications channel 225 in a variety of ways. For example, hypervisor 204 may allocate a region of shared memory that may allow only insecure OS 216 to write to the memory and allow only authorization management platform 228 to read from the memory. Hypervisor 204 may also create first communications channel 225 using any other suitable communications mechanism.

Returning to FIG. 4 in step 404, policy-enforcement module 106 may determine whether a requestor has a right to access encrypted data 316. In certain embodiments, this step may be performed locally. Policy-enforcement module 106 may make the determination locally, basing the decision on user-identity information obtained by authentication module 104. In some embodiments, policy-enforcement module 106 may obtain an access policy sent by insecure OS 216 in its request. In other embodiments, policy-enforcement module 106 may utilize a policy stored within authorization management system 228. Policy-enforcement module 106 may also communicate with policy server 308 to determine that the requestor has the right to access the requested encrypted data.

After determining that the requestor has a right to access encrypted data 316, cryptography module 108 may decrypt encrypted data 316 to provide decrypted data 224 (step 406). As part of decrypting encrypted data 316, cryptography module 108 may obtain a decryption key. In some embodiments, the decryption key may be obtained locally. In other embodiments, the decryption key may be obtained from policy server 308. At step 408, an authorization module may permit a secure platform to access the decrypted data. For example, authorization module 102 may transmit decrypted data 224 to viewer/editor OS 218 through a second communications channel 227.

Hypervisor 204 may create second communications channel 227 in a variety of ways. As in the case of first communications channel 225, hypervisor 204 may allocate a region of shared memory that may serve as second communications channel 227. Unlike in the case of first communications channel 225, the shared memory that may comprise second communications channel 227 may be both readable and writable by both authorization management platform 228 and viewer/editor OS 218. In an alternative embodiment, hypervisor 204 may create a virtual network-interface connection with a file server between viewer/editor OS 218 and authorization management platform 228.

In some embodiments, the region of shared memory may comprise curtained memory. Using curtained memory may help prevent malicious programs running on insecure OS 216, or programs running on any other insecure virtual machine, from accessing decrypted data 224 while the decrypted data is being accessed by viewer/editor OS 218. According to at least one embodiment, the entire memory region used by viewer/editor OS 218 may need to be curtained memory to adequately sandbox viewer/editor OS 218.

In some embodiments, as previously mentioned, hypervisor 204 may create a virtual network-interface connection between viewer/editor OS 218 and authorization management platform 228. The virtual network-interface connection may be carefully monitored by the hypervisor to ensure access to the connection is available only to authorization management platform 228 and viewer/editor OS 218.

Returning to step 408 in FIG. 4, authorization management platform 228 may transmit decrypted data 224 through second communications channel 227 to viewer/editor OS 218 where it may be viewed, read, and/or edited, as requested by at least one of applications 222. After completion of step 408, exemplary method 400 may terminate. This method may allow access to encrypted data 316 to be granted only to requestors that can prove their right to access the request data.

For example, a user may login to insecure OS 216 on exemplary client system 200. The user may request within an application to view a document, which is in the form of encrypted data 316 in storage device 306. The request may be identified by authorization management platform 228 and may comprise the encrypted data being requested, an access-policy associated with the encrypted data, and a proof of the user's right to access the encrypted data. The proof may comprise an indication of the user's identity obtained from directory server 314 at login based on the user's username and password. In other embodiments, the proof may be a public key obtained from public-key infrastructure 324 accessed by a private key. The private key may be stored on a smartcard with which the user securely authenticates to the system. In some embodiments, such as those in which the request does not contain a proof, authentication module 104 may obtain the proof from authentication system 304.

Policy-enforcement module 106 may determine that the user who made the request has the right to access encrypted data 316. This determination may be based on the proof and the access policy received in the request or a locally stored access policy. After the determination has been made, cryptography module 108 may decrypt encrypted data 316 providing decrypted data 224. Authorization module 102 may then permit decrypted data 224 to be displayed in a window made by viewer/editor OS 218 for one of applications 222 by transmitting it through second communications channel 227. In other embodiments, the policy-enforcement module may not make determinations locally, but instead may communicate with external devices or software that make the determination remotely.

FIG. 5 illustrates computer-implemented method 500 for securely managing access to data. The method may begin with step 502, where a request to access encrypted data may be identified. This encrypted data may comprise encrypted data 316. In step 504, the request may be submitted to a policy server. For example, the request may be sent by policy-enforcement module 106 in FIG. 1 to policy server 308 in FIG. 3. Policy server 308 may determine whether the requestor has the right to access encrypted data 316. In step 506, permission to access the encrypted data may be received from policy server 308. For example, authorization management platform 228 may receive permission from policy server 308 to access encrypted data 316.

After permission has been received from the policy server, the cryptography module may decrypt the encrypted data to provide decrypted data (step 508). In step 510, an authorization module may permit a secure platform to access the decrypted. For example, authorization management platform 228 may transmit the decrypted data through second communications channel 227 to the viewer/editor OS 218, thereby permitting the secure platform to access the decrypted data. After completion of step 510, computer-implemented method 500 may terminate.

In at least one embodiment, a signature may be included with the request by the requestor before it is submitted to authorization management platform 228 through first communications channel 225. In an additional embodiment, a second signature may be included with the request by authorization module 102 or by authorization management platform 228. According to various embodiments, content-access module 221 may submit the signature and a proof through first communications channel 225 to authorization management platform 228. The proof may be sent to policy server 308, and policy server 308 may check the proof for validity.

The functions of identifying, including, submitting, receiving, decrypting, and/or permitting associated with computer-implemented methods 400, 500, and 600 may be performed by a proof-carrying authorization platform. The technique of proof-carrying authorization is one in which the proof of a user's right to access data is submitted along with the request to access that data. Proof-carrying authorization is a distributed authentication and authorization framework based on higher-order logic. It provides no decision procedure, so proofs must be submitted with requests.

For example, a user may request to view encrypted data 316. Authorization module 102 may identify the request. Policy-enforcement module 106 may submit the request over a network to policy server 308. Based on the request (which may contain the user's identity as proof and an access-control policy), policy server 308 may determine that the proof is valid. The user may therefore be allowed to access encrypted data 316.

In at least one embodiment, a policy may only grant access to encrypted data 316 to members of a specific work group. In such an embodiment, the request may comprise more than one proof and more than one signature. For example, the request may comprise a proof of a user's identity, a signature made by the user, a proof that the user is a member of the specific work group, and a signature made by the authority managing the specific work group.

Determining that the user has the right to access the requested encrypted data 316 may comprise determining that all submitted proofs are valid and/or that all submitted signatures have been made by correct authorities. Authorization module 102 may receive permission from policy server 308 to allow the user to access the encrypted data. To provide decrypted data 224, cryptography module 108 may decrypt encrypted data 316. Viewer/editor OS 218 may display decrypted data 224 to the user, after authorization management platform 228 transmits the decrypted data through second communications channel 227.

In an additional embodiment, insecure OS 216 may receive encrypted data 316 from a remote, networked device. In such an embodiment, identifying the request to access encrypted data 316 may comprise receiving the encrypted data 316. For example, a first employee who belongs to a specific work group may email a file containing encrypted data 316 as an attachment to a second employee also belonging to the group. One of applications 220 running on insecure OS 216 may receive the email. Authorization management platform 228 may identify the receipt of the email as a request to read the attached encrypted data 316. In other embodiments, after receiving the email, the second employee may attempt to access encrypted data 316, and authorization management platform 228 may identify the request to read encrypted data 316.

In order to determine whether the second user has a right to access the encrypted data, authorization management platform 228 may submit the request to policy server 308. The policy server may determine that access to the data should be granted to all members of the specific work group. Since the second employee belongs to the specific work group, authorization management platform 228 may receive permission from the policy server to access the encrypted data. The authorization management platform may decrypt the attached encrypted data 316 to provide decrypted data. After the viewer/editor OS 218 receives the decrypted data from authorization management platform 228, the second employee may access the decrypted data using one of applications 222.

FIG. 6 demonstrates a computer-implemented method 600 for creating a file within a securely managed system. The method may begin with the creation of the file in step 602. The file may be created by an application running on viewer/editor OS 218 running on secure platform. In some embodiments, a request to create a file may be received by authorization module 102 from one of applications 220 running on insecure OS 216.

The file may be encrypted to create encrypted data (step 604). For example, cryptography module 108 may encrypt the file to create encrypted data, such as encrypted data 316. In step 606, an access policy may be associated with the encrypted data. This step may be performed in a variety of ways. In at least one embodiment, a user interface may prompt a user to associate an access policy with the file. In another embodiment, authorization management platform 228 may determine an access policy, based on the authentication information of the user, to associate with the encrypted data. Alternatively, the access policy associated with encrypted data 316 may be based on information received from policy server 308.

For example, a user may make a request to create a file in one of applications 220 running on insecure OS 216. Authorization management platform 228 may determine that the user has a right to create a file. One of applications 222 running on viewer/editor OS 218 may create the file. Before storing the newly created file on storage device 306, cryptography module 108 may encrypt the data to protect the file. Authorization management platform 228 may then associate an access policy with the file based on the right that allowed the user to create the file.

Figure 7:
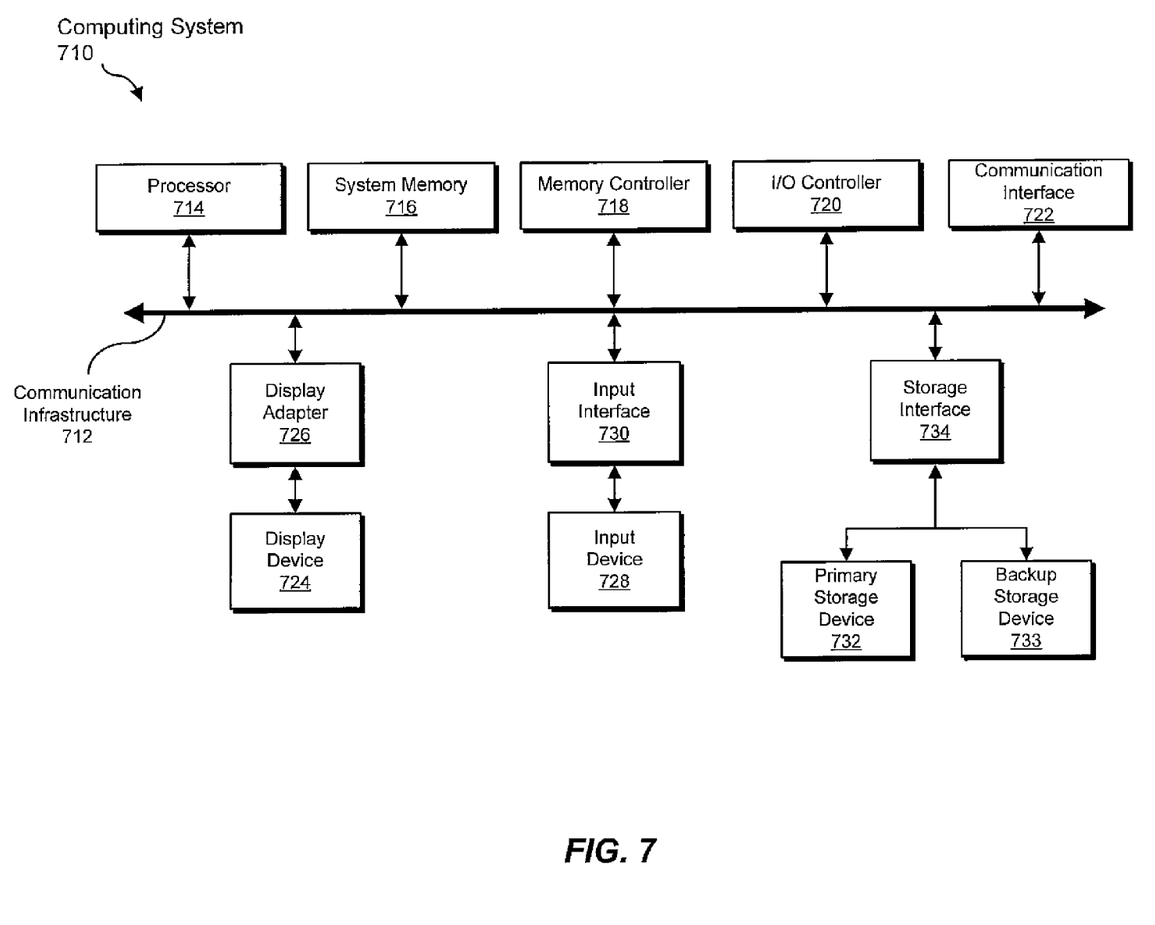
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, including, submitting, receiving, decrypting, permitting, and/or determining steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as identifying, including, submitting, receiving, decrypting, permitting, and/or determining.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for identifying, including, submitting, receiving, decrypting, permitting, and/or determining steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, including, submitting, receiving, decrypting, permitting, and/or determining steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, including, submitting, receiving, decrypting, permitting, and/or determining steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, the exemplary file systems disclosed herein may be stored on primary storage device 732, while the exemplary file-system backups disclosed herein may be stored on backup storage device 733. Storage devices 732 and 733 may also be used, for example, to perform and/or be a means for performing, either alone or in combination with other elements, one or more of the identifying, including, submitting, receiving, decrypting, permitting, and/or determining steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
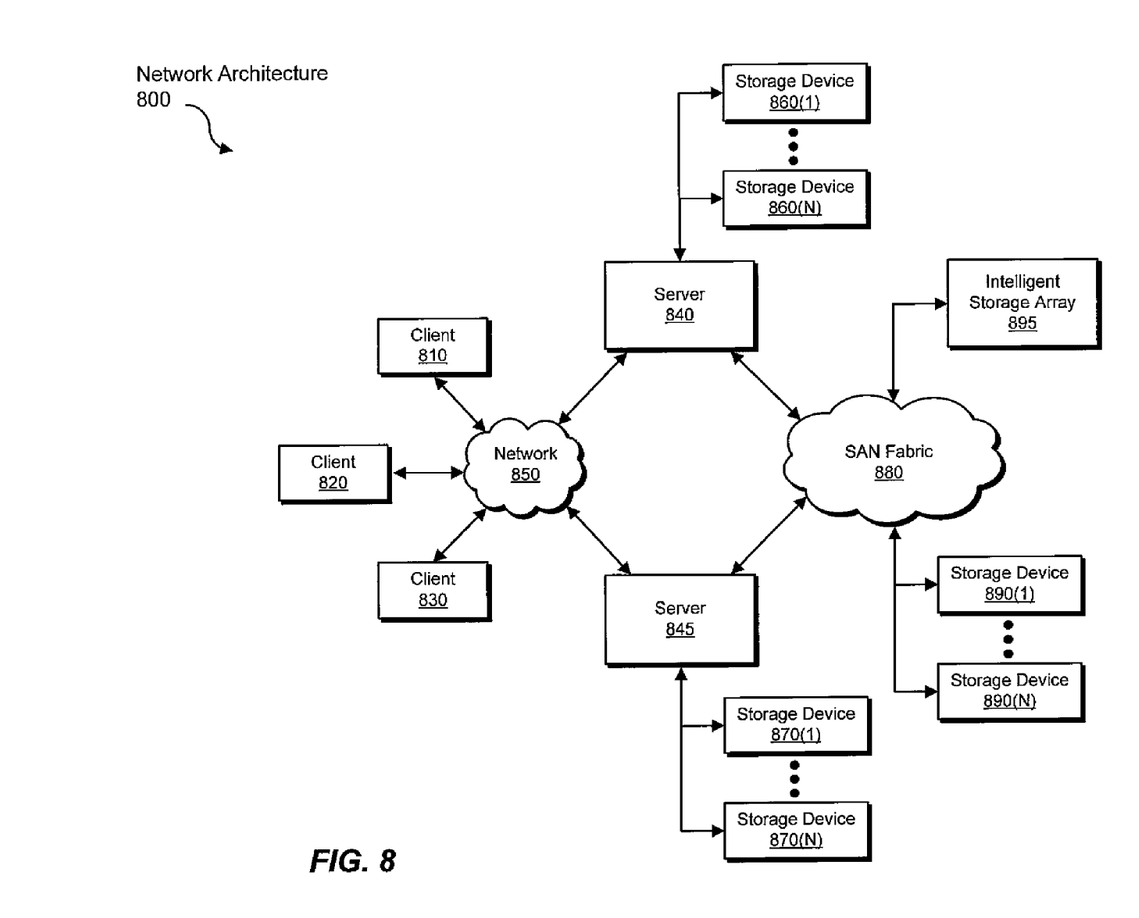
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

Accordingly, network architecture 800 may perform and/or be a means for performing, either alone or in combination with other elements, one or more of the identifying, including, submitting, receiving, decrypting, permitting, and/or determining steps disclosed herein. Network architecture 800 may also be used to perform and/or be a means for performing other steps and features set forth in the instant disclosure.

As detailed above, computing system 710 and/or one or more of the components of network architecture 800 may perform and/or be a means for performing, either alone or in combination with other elements, one or more steps of the exemplary methods described and/or illustrated herein. For example, a computer-implemented method for securely managing access to data may comprise identifying a request to access encrypted data (the request being made by an application running on an insecure platform). The method may also comprise determining that a requestor has a right to access the encrypted data, decrypting the encrypted data to provide decrypted data, and permitting a secure platform to access the decrypted data.

In some embodiments, the request to access encrypted data comprises a request to read, edit, and/or view the encrypted data. In at least one embodiment, the request may comprise the encrypted data, an access policy associated with that encrypted data, and a proof of the requestor's right to access the encrypted data. Determining that the requestor has the right to access the encrypted data further may comprise electing, based on the proof and the access-policy, to allow access to the encrypted data and then decrypting the encrypted data using a locally stored decryption key.

In other embodiments, such a determination may further comprise including a signature with the request, submitting the request and the signature to a policy server, and receiving a decryption key from the policy server. In at least one embodiment, a hypervisor may manage the insecure platform, comprising an insecure virtual machine, and the secure platform, comprising a first secure virtual machine. The hypervisor may also manage an authorization management platform as a second secure virtual machine. The hypervisor may limit the input and output access of the first secure virtual machine to local input and output devices. The local input and output devices may comprise a keyboard, a mouse, and a video card to allow the first secure virtual machine to display to a computer monitor.

The hypervisor may create a communications channel between the first secure virtual machine and a proof-carrying authorization platform (which may perform identifying, including, submitting, receiving, decrypting and/or permitting) by allocating a region of memory that is shared by the first secure virtual machine and the proof-carrying authorization platform and is secured against access by the insecure virtual machine. In some embodiments, the first secure virtual machine may run on a computing device that comprises hardware that complies with a trusted hardware standard.

A computer-implemented method for securely managing access to data may comprise identifying a request to access encrypted data (the request being made by an application running on an insecure platform), submitting the request to a policy server, receiving permission from the policy server to access the encrypted data, decrypting the encrypted data to provide decrypted data, and permitting a secure platform to access the decrypted data. In at least one embodiment, submitting the request to a policy server may comprise including a signature with the request and submitting the signature and the request to the policy server.

In certain embodiments, identifying the request to access encrypted data may comprise receiving a request to create a file. The file may be created by an application running on the secure platform. An access policy may be associated with the file, which may be encrypted to create encrypted data. The associated access policy may be defined by a user.

Additionally, the hypervisor may create a secure virtual network to facilitate communication between the secure platform and the proof-carrying authorization platform. In some embodiments, the insecure platform may receive the encrypted data from a remote, network device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for securely managing access to data, the method comprising:
    identifying a request to access encrypted data, the request being made by an application running on an insecure platform;
    determining that a requestor has a right to access the encrypted data;
    decrypting the encrypted data to provide decrypted data;
    in response to identifying the request to access encrypted data and determining that the requestor has the right to access the encrypted data, permitting a secure platform to access the decrypted data, wherein:
        an authorization platform performs at least one of the steps of identifying, including, submitting, receiving, decrypting, and permitting;
        the insecure platform comprises an insecure virtual machine;
        the secure platform comprises a first secure virtual machine;
        the authorization platform comprises a second secure virtual machine;
        a hypervisor manages the insecure virtual machine, the first secure virtual machine, and the second secure virtual machine;
        the authorization platform comprises a proof-carrying authorization platform that facilitates authentication information being included with the request to access the encrypted data.

2. The computer-implemented method of claim 1, wherein:
    the secure platform comprises a viewer/editor guest operating system secured by a hypervisor that manages the viewer/editor guest operating system and the insecure platform;
    the viewer/editor guest operating system has limited access to input/output devices.

3. The computer-implemented method of claim 1, wherein the request comprises at least one of:
    the encrypted data;
    an access-policy associated with the encrypted data;
    a proof of the right of the requestor to access the encrypted data.

4. The computer-implemented method of claim 3, wherein determining that the requestor has the right to access the encrypted data further comprises:
    determining, based on the proof and the access-policy, to allow access to the encrypted data;
    decrypting the encrypted data using a locally-stored decryption key.

5. The computer-implemented method of claim 3, wherein determining that the requestor has the right to access the encrypted data further comprises:
    including a signature with the request;
    submitting the request and the signature to a policy server, the policy server determining that the requestor has the right to access the encrypted data;
    receiving a decryption key from the policy server.

6. The computer-implemented method of claim 1, wherein the hypervisor creates a communications channel between the first secure virtual machine and the authorization platform by allocating a region of memory that is:
- shared by the first secure virtual machine and the proof-carrying authorization platform;
- secured against access by the insecure virtual machine.

7. The computer-implemented method of claim 6, wherein:
- the region of memory comprises curtained memory that prevents programs running on the insecure platform from accessing the decrypted data while the secure platform is allowed access to the decrypted data.

8. A computer-implemented method for securely managing access to data, the method comprising:
- identifying a request to access encrypted data, the request being made by an application running on an insecure platform;
- submitting the request to a policy server;
- receiving permission from the policy server to access the encrypted data;
- decrypting the encrypted data to provide decrypted data;
- instead of permitting the decrypted data to be accessed via the insecure platform from which the data was requested, permitting a secure platform to access the decrypted data, wherein:
  - an authorization platform performs at least one of the steps of identifying, submitting, receiving, decrypting, and permitting;
  - the insecure platform comprises an insecure virtual machine;
  - the secure platform comprises a first secure virtual machine;
  - the authorization platform comprises a second secure virtual machine;
  - a hypervisor manages the insecure virtual machine, the first secure virtual machine, and the second secure virtual machine;
  - the authorization platform comprises a proof-carrying authorization platform that facilitates authentication information being included with the request to access the encrypted data.

9. The computer-implemented method of claim 8, wherein:
- the request to access the encrypted data comprises at least one of:
  - the encrypted data;
  - an access-policy associated with the encrypted data;
  - a proof of a right of a requestor to access the encrypted data;
- submitting the request to the policy server comprises:
  - including a signature with the request;
  - submitting the request and the signature to the policy server.

10. The computer-implemented method of claim 8, wherein:
- the secure platform is programmed to enable at least one of:
  - viewing the decrypted data;
  - editing the decrypted data;
- the hypervisor limits I/O access of the first and second secure virtual machines to local I/O devices.

11. The computer-implemented method of claim 10, wherein the local I/O devices consist of one or more of:
- a keyboard;
- a mouse;
- a video card.

12. The computer-implemented method of claim 8, further comprising:
- creating a secure virtual network that facilitates communication between the secure platform and the proof-carrying authorization platform.

13. The computer-implemented method of claim 8, wherein:
- the insecure platform receives the encrypted data from a remote network device;
- the authorization platform receives the request to access the encrypted data, wherein identifying the request comprises receiving the request.

14. The computer-implemented method of claim 8, wherein:
- identifying the request to access encrypted data comprises receiving a request to create a file.

15. The computer-implemented method of claim 14, further comprising:
- creating the file, the file being created by an application running on the secure platform;
- encrypting the file to create the encrypted data;
- associating an access policy with the encrypted data.

16. The computer-implemented method of claim 15, further comprising:
- receiving a definition of the access policy from a user.

17. A system for securely managing access to data, the system comprising:
- an authorization platform programmed to receive a data-access request from an insecure platform;
- an authentication module in communication with the authorization platform, the authentication module being programmed to provide identity information of a user;
- a policy-enforcement module in communication with the authorization platform, the policy-enforcement module being programmed to use the identity information to determine whether to approve the data-access request;
- a cryptography module programmed to decrypt data identified by the data-access request to allow the data to be accessed on a secure platform instead of permitting the decrypted data to be accessed via the insecure platform from which the data was requested, wherein:
  - the insecure platform comprises an insecure virtual machine;
  - the secure platform comprises a first secure virtual machine;
  - the authorization platform comprises a second secure virtual machine;
  - a hypervisor manages the insecure virtual machine, the first secure virtual machine, and the second secure virtual machine;
  - the authorization platform comprises a proof-carrying authorization platform that facilitates authentication information being included with the data-access request.

* * * * *